US006895064B2

(12) United States Patent
Ritter

(10) Patent No.: US 6,895,064 B2
(45) Date of Patent: May 17, 2005

(54) SPALLATION DEVICE FOR PRODUCING NEUTRONS

(75) Inventor: Guillaume Ritter, Aix en Provence (FR)

(73) Assignee: Commissariat a l'Energie Atomique, Paris (FR)

( * ) Notice: Subject to any disclaimer, the term of this patent is extended or adjusted under 35 U.S.C. 154(b) by 28 days.

(21) Appl. No.: 10/332,703

(22) PCT Filed: Jul. 10, 2001

(86) PCT No.: PCT/FR01/02215

§ 371 (c)(1),
(2), (4) Date: Jan. 13, 2003

(87) PCT Pub. No.: WO02/05602

PCT Pub. Date: Jan. 17, 2002

(65) Prior Publication Data

US 2003/0152187 A1 Aug. 14, 2003

(30) Foreign Application Priority Data

Jul. 11, 2000 (FR) ............................ 00 09028

(51) Int. Cl.⁷ ............................................... G21G 4/02
(52) U.S. Cl. ..................... 376/194; 376/190; 376/196; 376/199; 376/202
(58) Field of Search ........................ 376/190, 192–195, 376/199, 200, 202, 170–173

(56) References Cited

U.S. PATENT DOCUMENTS

| 2,929,933 | A | * | 3/1960 | Ela, Jr. et al. ............... 376/192 |
| 2,933,442 | A | * | 4/1960 | Lawrence et al. ............ 376/193 |
| 3,013,173 | A | * | 12/1961 | Sturrock ....................... 313/84 |
| 3,453,175 | A | * | 7/1969 | Hodge .......................... 376/194 |
| 3,993,910 | A | * | 11/1976 | Parkin et al. ................ 376/199 |
| 4,119,858 | A |   | 10/1978 | Cranberg |
| 4,122,347 | A |   | 10/1978 | Kovalsky et al. |
| 4,293,794 | A |   | 10/1981 | Kapetanakos |
| 4,696,782 | A | * | 9/1987 | Clayton et al. .............. 376/194 |
| 5,160,696 | A |   | 11/1992 | Bowman |
| 5,774,514 | A |   | 6/1998 | Rubbia |
| 5,811,943 | A |   | 9/1998 | Schonberg et al. |

FOREIGN PATENT DOCUMENTS

| JP | 2000 082598 | 3/2000 |
| WO | 99 59158 | 11/1999 |

OTHER PUBLICATIONS

Energy, vol. 87, No. 5, p. 10, Abstract No. 05, 040–787, Feb. 3, 1987.*
HEDL–TME 84–29, "Experimental Lithium System Final Report", Hanford Engineering Development Lab., Kolowith et al, pp. 30–36, 140, 141, Apr. 1985.*
Jean–Michel Lagniel: "The various parts of the accelerator: From the proton source to the 1 GeV beam" Gedeon Workshop: "Which Accelerator for Which Demo?", Nov. 25–Nov. 26, 1999.
M. Salvatores et al.: "The potential of accelerator–driven systems for transmutation or power production using thorium or uranium fuel cycles", Nuclear Science and Engineerings, vol. 126, pp. 333–340, 1997.

* cited by examiner

Primary Examiner—Harvey E. Behrend
(74) Attorney, Agent, or Firm—Oblon, Spivak, McClelland, Maier & Neustadt, P.C.

(57) ABSTRACT

A spallation device for production of neutrons includes a spallation target that produces neutrons by interaction with a hollow particle beam propagating within a first chamber, a second chamber containing the spallation target, and a leak tight partition separating the first and second chambers. The spallation device is particularly applicable to basic physics, medicine, and transmutation.

9 Claims, 7 Drawing Sheets

SPALLATION DEVICE FOR PRODUCING NEUTRONS

TECHNICAL FIELD

This invention relates to a spallation device for the production of neutrons.

The device is used in applications in all fields in which an intense neutron source is necessary.

The invention is particularly applicable to basic physics, medicine and transmutation of material.

STATE OF PRIOR ART

Note that spallation corresponds to the interaction of particles, and particularly protons, output from an accelerator and with the high energy equal to about 200 MeV or more, with nuclei of a target.

This interaction produces neutrons, for example about 30 neutrons per 1 GeV incident proton when the target is made of liquid lead. About 80% of these neutrons originate from evaporation and the remainder originate from inter-nuclear cascades. The spectrum of these neutrons has a peak at about 3.5 MeV.

A spallation target may be solid, or it may be liquid. It may also be thick or thin.

A liquid spallation target forms its own heat transporting liquid. It is usually composed of a heavy metal in the liquid state, for example chosen among liquid lead, eutectics of lead, bismuth and mercury.

This liquid target cools the last interface separating it from the vacuum chamber, the particles that will interact with this target circulate in the vacuum chamber, or from any other buffer region inserted between this vacuum chamber and the target.

FIG. 1 shows a longitudinal diagrammatic sectional view of a known spallation device comprising a spallation target 2 made of a liquid heavy metal. This device also comprises the chamber 4 in which the spallation target circulates. Reference 6 represents the spallation region.

An inlet 8 of a cold heat transporting fluid (target) can also be seen at one end of this chamber 4, and an outlet 10 of the hot heat transporting fluid can be seen at the other end of the chamber.

A vacuum chamber 12 can also be seen within which the particle beam 14 travels, which will interact with the target in the spallation region 6. This vacuum chamber is separated from the chamber 4 by a first window 16 forming a diaphragm that is cooled by water circulation.

A second convex-shaped window 18 can also be seen, which is convex towards the inside of the chamber 4. This second chamber 18 extends from the first window 16 towards the inside of the chamber and cooperates with the window 16 to form a leak tight partition, delimiting a buffer region 20 or an intermediate region, in which a vacuum has also been created.

This second window 18 forms a membrane cooled by the spallation target 2.

The convex shape of this window is dictated by the need to guide the fluid entering through the inlet pipe 8 towards the spallation region 6, minimizing the stagnation zone n in which the cooling is not efficient.

A grid 22 can also be seen that will direct flow from the liquid target and arranged in the chamber 4, between the second window 18 and the spallation region 6.

As can be seen, the spallation target and the second window 18 have a symmetry of revolution about an X-axis along which the particle beam 14 travels.

In the example shown, this beam that passes through the first and second windows and the grid 22 in sequence before interacting with the liquid target in the spallation region 6, and the flow of this liquid target in this region 6, are in the same direction.

Now consider known spallation devices using solid spallation targets.

This type of device comprises a window that will confine the solid target to be aligned with particle beam acceleration means, the target itself being intended to supply neutrons by spallation and for example being in the form of boards, cones, bars, tubes or microballs, and a heat transporting fluid that will cool the spallation target. The nature of each of these devices is determined by its thermal, hydraulic, mechanical and neutronic properties.

For a solid target that will supply thermal neutrons, the transporting fluid way be water. This is very difficult if not impossible when the medium surrounding the spallation target has a fast neutron spectrum.

FIG. 2 shows variations in the current density D1 of a particle beam, used with a known spallation target, as a function of the distance R to the centre line of this beam.

This type of beam, for which the current density has a distribution approximately in the shape of a notch (curve I) or a bell (curve II), induces strong thermomechanical stresses in the leak tight partition separating the spallation target from the vacuum in which the beam is propagated, and also in the target when the target is solid, due to a high current density gradient.

This particle beam has a peak on the axis of symmetry of the target, in a zone in which the heat transporting fluid circulates very little (see curve III in FIG. 2 which is the curve of variations of the velocity V of the fluid as a function of R). Consequently, there is a hot point on the leak tight partition that limits the performances of the spallation target and can threaten confinement.

In some spallation devices, including the device shown in FIG. 1, the existence of this zone in which the heat transporting fluid circulates very little on the centre line of the particle beam, makes it necessary to install the grid 22 irradiated directly by the beam and makes it possible to channel the flow so as to limit the length of this zone in which the heat transporting flow velocity is too low.

Like all elements placed on the centre line of the beam, this grid is affected by irradiation from this beam and its mechanical and thermal performances deteriorate during time. However, this grid does not contribute to spallation and its volume is such that if any damage occurs, this grid will in turn damage or even destroy the spallation target, particularly by partial or total closing off of heat transporting fluid circuits.

Cooling by high flow water circulation in the membrane 16 generally made of steel, controls temperature rises caused by the passage of the beam.

In a target subjected to an intense beam, the presence of a heavy material immediately behind the window 18 causes the window 18 to absorb part of the energy of the beam. This systematically occurs with liquid targets.

Cooling of the window 18 is only possible on one face of the window, and this window has to be cooled (or any other window) has to be cooled by the liquid target itself.

There will be a hot point if the particle beam has a current density peak at the point at which the velocity of the target forming the heat transporting fluid is minimum.

Note also that spallation devices are also described in documents [1] and [2], which like other documents mentioned subsequently, are mentioned at the end of this description.

PRESENTATION OF THE INVENTION

The purpose of this invention is to overcome the disadvantages mentioned above with known spallation devices and more precisely to minimize thermomechanical constraints applied to key components of these devices, and particularly the leak tight partition separating the spallation target from a chamber in which the vacuum is created and through which the particle beam passes before it reaches the target.

Precisely, the purpose of this invention is a spallation device for the production of neutrons, this device comprising:

a spallation target that will produce neutrons by interaction with a particle beam, a first chamber containing the spallation target, means of generating the particle beam, a second chamber in which the particle beam will propagate towards the spallation target, along a line of propagation (which obviously requires the creation of a low pressure, below $10^{-8}$ Pa in this second chamber), a leak tight partition through which the particle beam can pass, separates the first chamber from the second chamber and reaches this propagation axis, and a heat transporting fluid intended to circulate in the first chamber to cool the spallation target, this device being characterized in that the particle beam is hollow and surrounds the propagation axis.

Preferably, the particles are chosen to be in the group comprising protons, deuterium nuclei, tritium nuclei, helium 3 nuclei and helium 4 nuclei.

According to a preferred embodiment of the device according to the invention, the radial distribution of the current density in the particle beam in the transverse half-plane delimited by the propagation axis is approximately gaussian and is offset from the axis of symmetry of the beam. This arrangement is characterized by a minimum current density on the centre line of the beam.

This type of current density in the beam minimizes mechanical stress concentrations.

According to a first particular embodiment of the device according to the invention, generation means are designed to produce the hollow particle beam directly, in other words by themselves.

According to a second particular embodiment, the generation means are designed to produce the hollow particle beam starting from a solid particle beam.

The spallation target in this invention may be solid.

In this case, according to a preferred embodiment of the invention, the spallation target comprises several successive elementary targets, each elementary target comprising a conical plate in which there is a central drilling.

This type of elementary target has a shape well adapted to the hollow beam and to the flow of the heat transporting fluid.

Preferably, if the spallation target is solid, a space is provided between the leak tight partition and the spallation target for circulation of the heat transporting fluid.

On the contrary, with this invention, it is possible to use a liquid spallation target, this target then also forming the heat transporting fluid.

In this case, according to a first particular embodiment of the invention, the spallation target moves in the first chamber along the propagation axis and along the direction of propagation of the particle beam.

According to a second particular embodiment, if the spallation target is liquid, the spallation target moves within the first chamber along the axis of propagation and in the direction opposite to the direction of propagation of the particle beam.

According to a preferred embodiment of this invention, the axis of symmetry of the spallation target is coincident with the propagation axis.

Preferably, the leak tight partition is convex towards the inside of the first chamber.

In this invention, the leak tight partition preferably has an axis of symmetry of revolution that is coincident with the propagation axis.

Preferably, the device according to the invention also comprises guide means for the heat transporting fluid at least in the direction of the leak tight partition, in the first chamber.

BRIEF DESCRIPTION OF THE DRAWINGS

This invention will be better understood after reading the description of example embodiments given below, for guidance only and in no way limitative, with reference to the attached drawings on which.

DETAILED PRESENTATION OF PARTICULAR EMBODIMENTS

Figure 3:
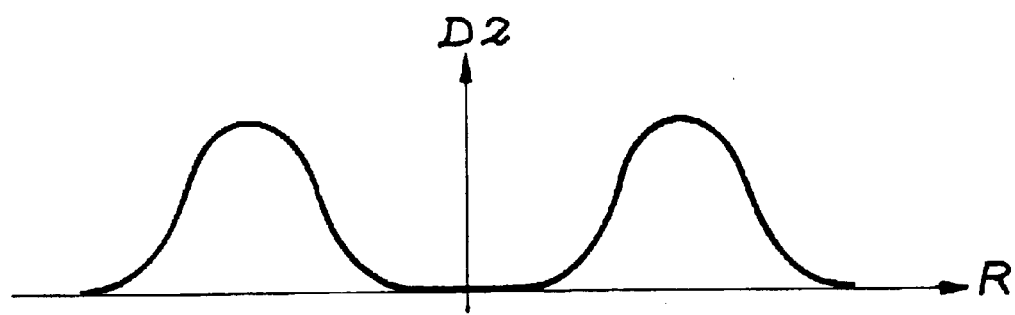

In the examples of the invention described below, a hollow particle beam also called an "annular particle beam" is used, in which the radial current density distribution is approximately gaussian. FIG. 3 diagrammatically illustrates variations of this density D2 as a function of the distance R from the hollow beam.

This is a means of solving the following two problems:
limiting the current density gradient to avoid excessive internal mechanical stresses in key components of the spallation device, and particularly the leak tight partition, and the spallation target in the case of a solid target, and moving the peak power away from the axis of symmetry of the target to avoid cooling problems.

An annular distribution of the current density in the particle beam can be obtained using magnetic optical means that are placed on the input side of the leak tight partition.

Figure 4:
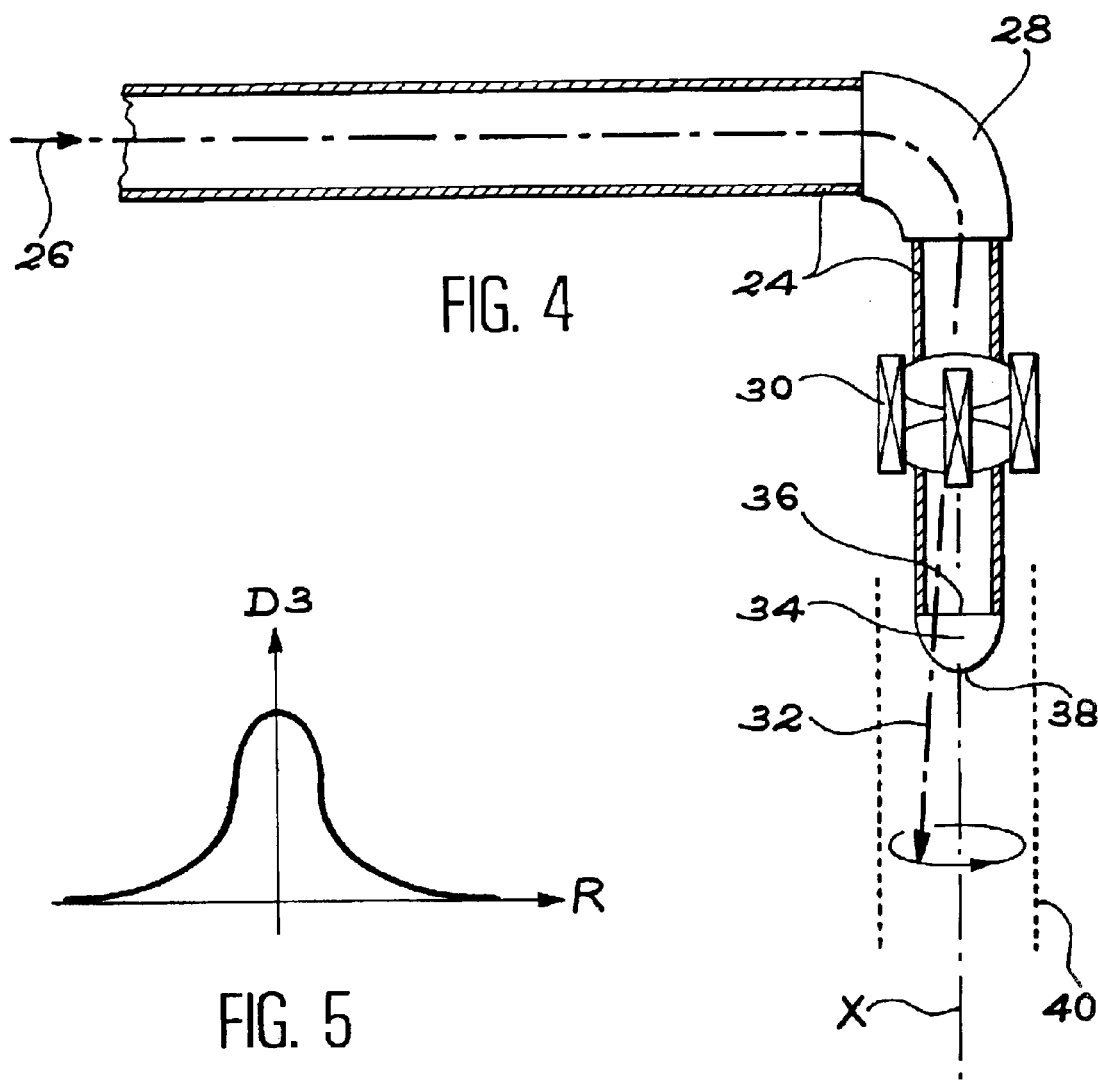
FIG. 4 is a diagrammatic view of a scanning device used to obtain a hollow beam that can be used in the invention, FIG. 5 diagrammatically illustrates the radial distribution of the current density in a particle beam that arrives at this scanning device.

FIG. 4 diagrammatically illustrates the generation of a hollow particle beam. FIG. 4 shows a vacuum chamber 24 that prolongs a particle accelerator, not shown, designed to form a solid particle beam 26 and to accelerate this beam. This vacuum chamber (that is provided with means not shown to create the vacuum) forms an elbow at which there is a curvature magnet 28. After this curvature magnet, there is a magnetic system 30 designed to make high frequency rotary scanning to obtain a hollow particle beam 32 with an axis denoted X, starting from the solid beam 26.

The vacuum chamber 24 terminates with a convex leak tight partition 38.

This partition is on the output side of a buffer-partition 36, if there is one (in this case, cooperating with partition 38 to delimit a zone reference 34 in FIG. 4) and inside the chamber 40 containing the spallation target.

The thickness and the material from which each of the partitions 36 and 38 are made are obviously chosen such that the beam 32 can pass through these partitions.

Figure 5:
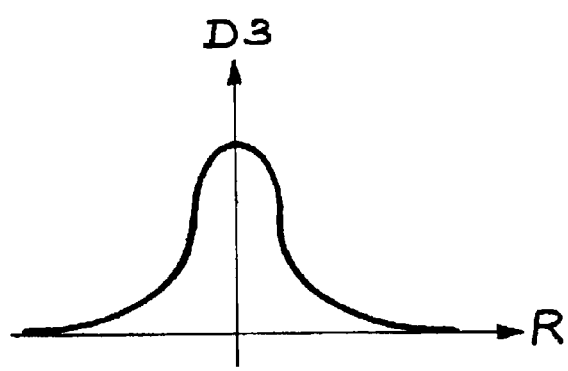

FIG. 5 shows variations of the current density D3 in the solid particle beam 26 as a function of the distance R from the centre line of the beam, at the exit from the curvature magnet 28. It can be seen that the beam 26 is approximately gaussian.

After the scanning system 30, and particularly in the spallation target, the particle beam becomes hollow, the distribution of the current density in this hollow beam being shown in FIG. 3.

The magnetic system 30 placed on the input side of the leak tight partition 38, is located on the trajectory of high energy particles that are backscattered by the spallation target. This is why the system is preferably composed of materials that are not very sensitive to radiation and activation. The curvature magnet 28 protects the particle accelerator from these high energy backscattered particles.

Note that other devices according to the invention can be made without any curvature magnet. In this case a vacuum chamber is used which is approximately straight on the input side of the magnetic scanning system 30.

The scanning possible with the system 30, preferably satisfies the requirements mentioned in document (3).

In another example, instead of forming the hollow particle beam from an accelerated solid beam, the hollow beam is formed from the particle source and this hollow beam is then accelerated. Further information about this subject can be found in document [4].

Note now that it is possible to provide guide means in the chamber 40, for example ribs, to channel cooling onto the leak tight partition 38 in order to avoid the need to replace this partition 38 too frequently.

Furthermore, in one device conform with the invention, it is preferable that the spallation target should be cooled by forced convection, regardless of whether the target is solid or liquid.

Furthermore, in a device according to the invention, the hollow particle beam may be input to the spallation target at any angle, from above or below and either obliquely or horizontally.

Figure 6:
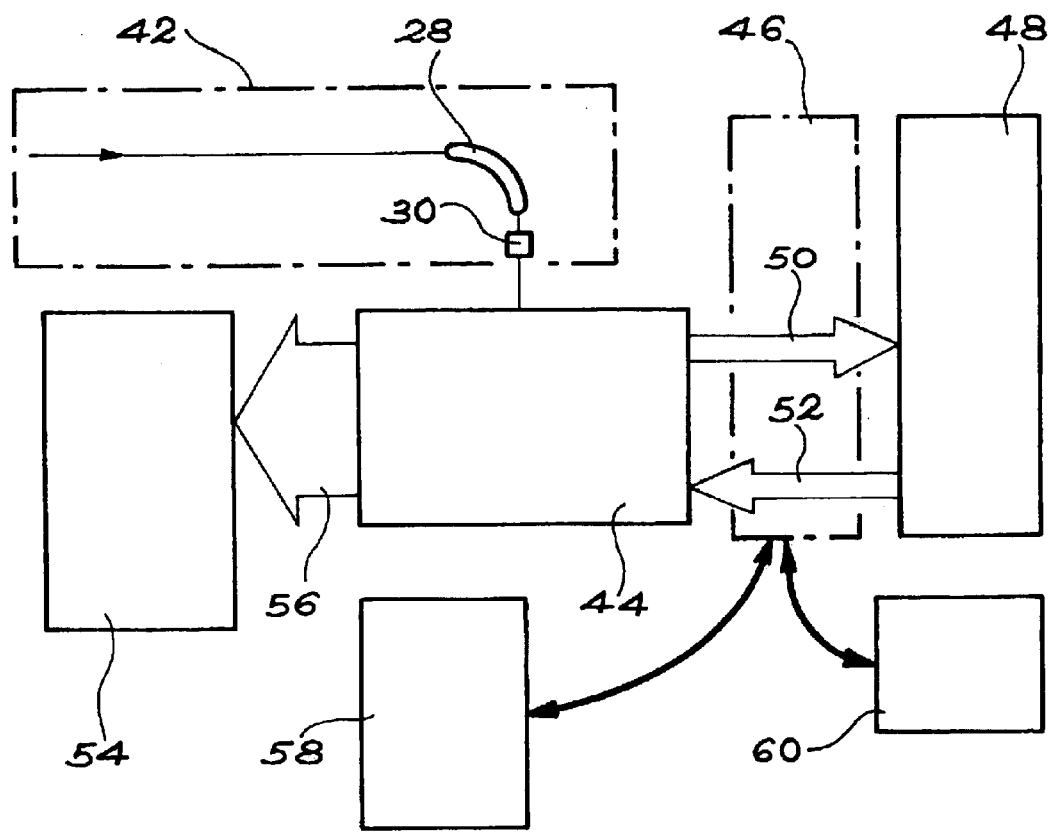
FIG. 6 is a diagrammatic view of various systems of a spallation installation, FIG. 6A diagrammatically illustrates the possibility of obtaining two different configurations for the flow of the heat transporting fluid and the particle beam in a device according to the invention with symmetry of revolution about the axis of the incident particle beam.

FIG. 6 diagrammatically illustrates several systems, all of which form an example of a spallation installation using the invention.

This installation comprises:
a system 42 that supplies the hollow particle beam and which includes the curvature magnet 28 and the scanning system 30 in FIG. 4, a spallation device 44 conform with the invention, onto which the hollow beam is directed, a system 46 comprising heat transporting fluid transport circuits, a heat exchanger system 48 that receives the hot heat transporting fluid 50 from the device 44 and supplies the cold heat transporting fluid to this device through the system 46, a useful coverage system 54 comprising irradiation means or nuclear fuel and/or isotopes to be transmuted and receiving neutrons 56 produced by the spallation device, a system 58 for cleaning circuits and for the treatment of radioactive effluents that is connected to the heat transporting fluid transport circuits system 46, and, a system 60 for draining these circuits.

This drain system 60 is useful for starting, stopping and maintenance operations in the installation and also during accidents or incidents in this installation.

The system 58 is used to extract undesirable species from the installation such as heavy radioactive contaminants and radioactive gases, and particularly tritium.

In one device according to the invention, accelerated particles are preferably lightweight (charged) particles such as protons, deutons, tritons, helium 3 nuclei, and helium 4 nuclei.

For example, protons may be used with an energy Ep equal to approximately 600 MeV to achieve a compromise between the neutronic efficiency of spallation, damage occurring on the leak tight partition and on other structures of the target, activation of the accelerator by particles lost due to space charge phenomena and activation of the spallation device, including biological shielding and the earth.

Depending on the configuration, this energy Ep can be adjusted within a range varying from 200 MeV to several GeV.

The intensity of the beam supplied by the accelerator is determined by spallation neutron needs of users of the spallation device, and for example varies between 0.5 mA and several hundred mA.

Figure 6A:
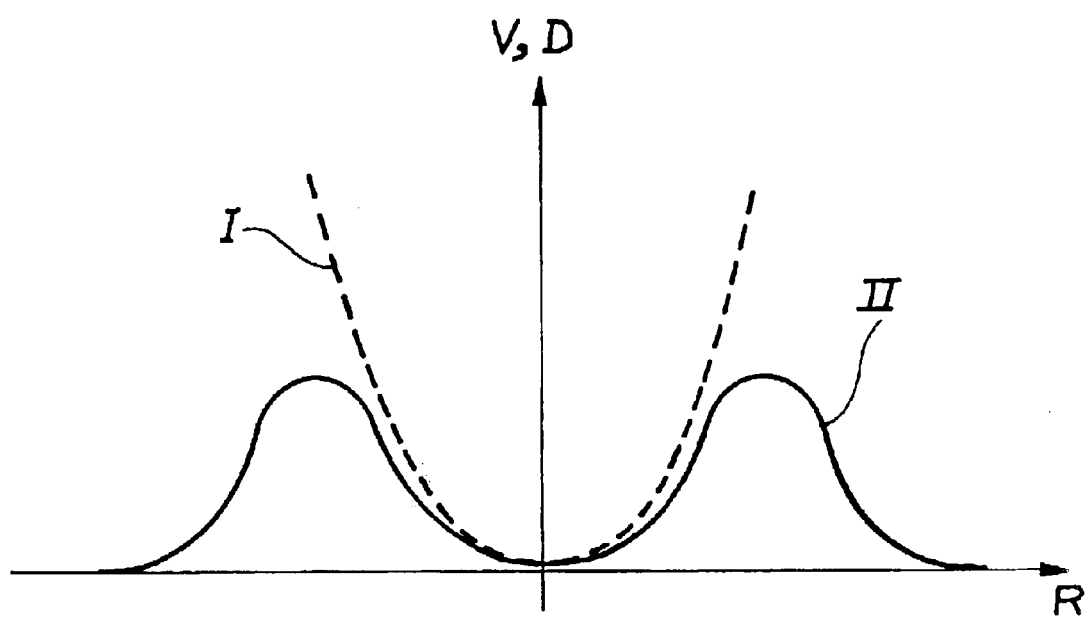

Thus, in one device according to the invention with a symmetry of revolution about the axis of the incident particles beam, it is possible to obtain two different configurations for the flow of heat transporting fluid and the particle beam (as shown in FIG. 6A in which curve I represents the fluid velocity V and curve II represents the current density D of the beam), due to the use of an annular particle beam while maintaining symmetry of revolution of the device about the axis of the beam.

Moreover, in one device conform with the invention using a solid spallation target, it is possible to separate cooling of the leak tight partition from cooling of the target, in which there are more degrees of freedom to direct the heat transporting fluid.

In the invention, it is advantageous to use conical plates in order to form a solid spallation target. An example of these plates is shown diagrammatically in FIG. 7.

At the centre of each plate 62a, there is a recess 65 through which the heat transporting fluid can dissipate heat generated in this plate.

Figure 8:
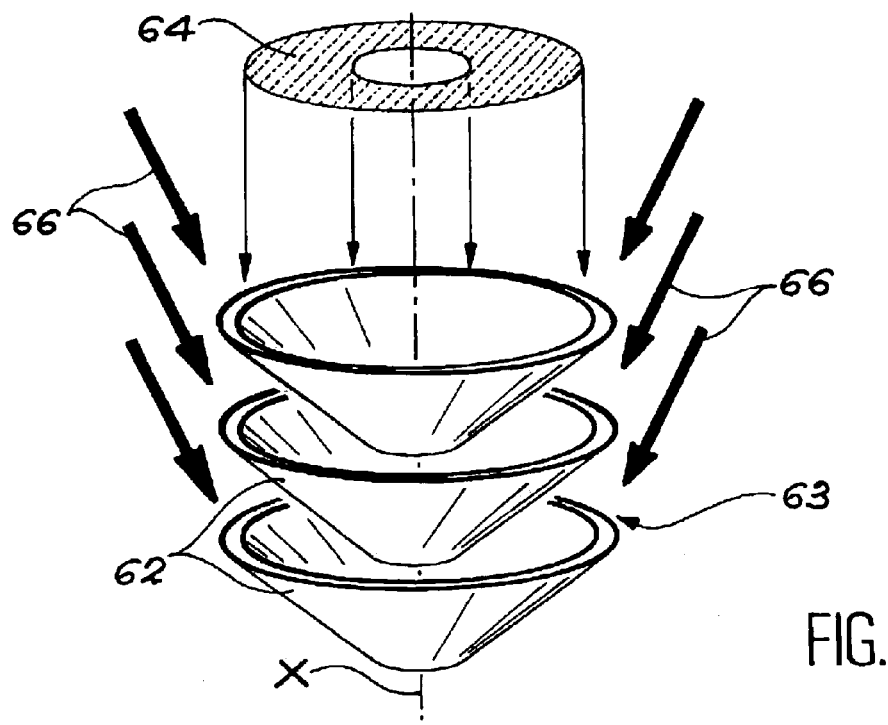
Figure 9:
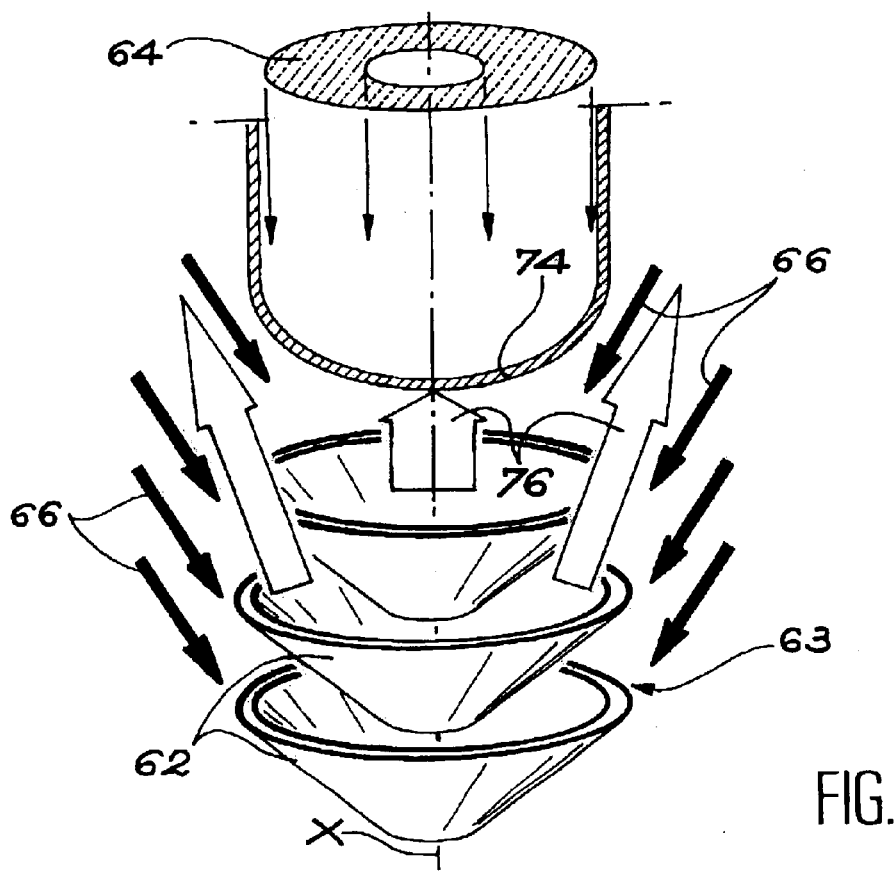
FIG. 9 shows the interposition of a part of the heat transporting fluid between the target in FIG. 8 and the leak tight partition separating this target from a vacuum chamber from which the particle beam arrives, and, FIGS. 10 to 12 are diagrammatic views of particular embodiments of the spallation device according to the invention.

A spallation target 63 is formed using several such plates 62 one after the other such that the resulting assembly 63 has a symmetry of revolution about the X axis of the hollow particle beam 64, as shown in FIGS. 8 and 9.

The plates 62 are arranged one after the other such that the solid angle perceived by an illuminated part of a plate facing the region in which the source neutrons are used and facing the partition 74 in FIG. 9 (backscattered neutrons) is occupied by a non-illuminated portion of the plate and vice versa.

Thus, the source spectrum is degraded in this part of the target before it reaches the useful region, so that damage can be limited to structural materials when this damage is due to the highest energy neutrons.

Furthermore, the quantity of backscattered neutrons is minimized, so that the life of the partition 74 is increased (FIG. 9) and damage inflicted to the structures of the accelerator before the target can be limited.

Note that the arrows 66 in FIG. 8 represent the heat transporting fluid.

Figure 7:
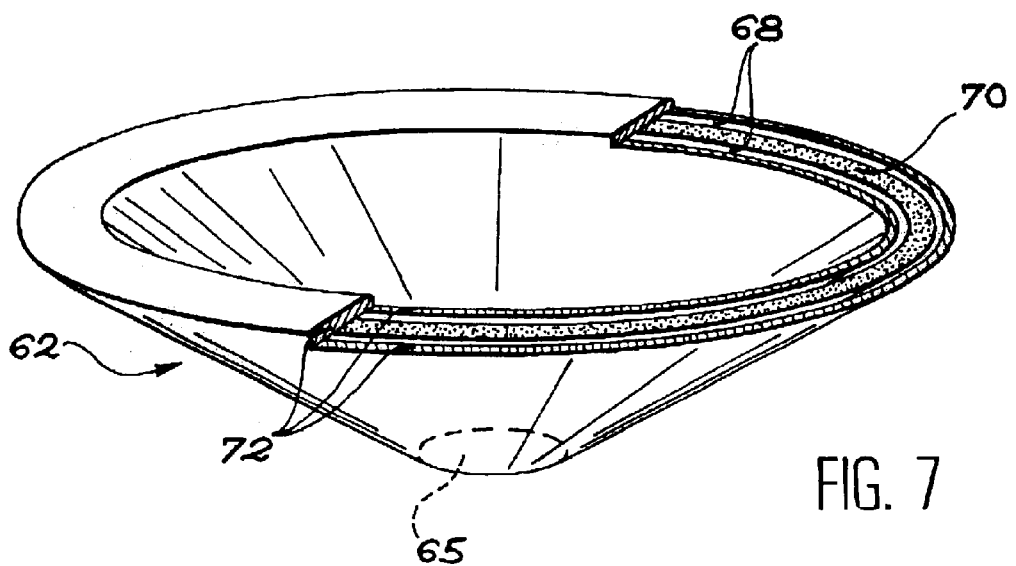
FIG. 7 is a partial cross sectional view of a known conical plate that can be used in the invention as an elementary spallation target, FIG. 8 diagrammatically illustrates a spallation target that can be used in the invention and that is formed from a stack of such elementary targets.

With reference to FIG. 7, it can be seen that the plates are clad, and a hollow space 68 is provided between an elementary spallation target composed of a conical plate 70, for example made of tungsten, and the cladding 72 of this elementary target, for example a steel or aluminium alloy cladding, in order to enable expansion of the elementary target during use.

Note also that the thickness of the plates 70 varies from one plate to another, to flatten the axial distribution of the neutron source.

With a solid target like that shown in FIG. 8, there are problems related to corrosion by the heat transporting fluid. For a solid spallation target, water is preferably used as a heat transporting fluid in, the case of a blanket when thermal neutrons are necessary, or liquid sodium in the case in which thermal neutrons are not required. The technologies associated with these types of fluid are controlled.

Spallation reactions on heat transporting liquids are unwanted because they reduce the neutron efficiency of the installation and contribute to general or localized activation of circuits (by redepositions).

However, purification technologies for circuits contaminated with unwanted species are known, both for sodium and for water.

Furthermore, heat transporting gases like carbon dioxide or helium hardly react with the incident particles due to the low density of these gases, which improves the efficiency without hindering overall operation of the installation.

Thus, a solid spallation target has the advantage that it confines radioactivity in this target (which is clad) and circuit purification systems. The spatial layout of the elements of this solid target is compatible with the handling system provided for these elements.

Liquid spallation targets are preferably composed of materials for which the atomic mass is high and which are pure or are in eutectic form so that they are liquid at temperatures compatible with the mechanical and chemical behaviour of the structural materials used in the target and in the associated circuits.

For example, mercury, lead and lead eutectics may be used. The main advantage of a eutectic such as lead-bismuth with 45% by mass of lead and 55% by mass of bismuth, apart from its low melting temperature, is that its density does not change during its phase change. Usually, it is preferred not to have any bismuth because bismuth can easily be activated into polonium 210 and other long life radioactive isotopes.

The cross sections of inelastic reactions of lead (n, xn) particularly the (n, 2n) reaction for a neutron energy exceeding 6.22 MeV, is a means of maximizing the efficiency of the source.

Mercury will be avoided in some devices due to its very strong physical corrosivity. At ambient temperatures, static mercury dissolves about 1 mm of steel per year.

Lead and lead alloys are also corrosive for steels, which is the reason for preferring clad solid targets. Pure or alloyed liquid lead can be used, while limiting corrosion effects, due to control of the oxygen concentration in the liquid lead. Operating conditions define an oxygen concentration interval above which the lead and the impurities are oxidized and precipitate, and below which lead corrodes steel. Steel is then dissolved in the circuit and can be deposited in cold zones or in zones in which the velocity of the heat transporting fluid is low. This type of deposit can cause blockage of circuits.

Finally, materials used in the invention are transparent to neutrons in the main spectrum of the target. Thus, pure or alloyed lead may be suitable for fast or thermal spectrum targets even if some isotopes naturally present would be worth extracting by isotope separation due to their large neutronic capture cross section.

Mercury and tungsten are better adapted to targets with essentially fast spectra to the extent that these two elements are more capable of capturing neutrons in the thermal range.

In the invention, the spallation target (that contains the spallation region) is confined, and only allows source neutrons to pass.

The structures included in this target are transparent to neutrons, and in a nominal or degraded situation, enable the best possible confinement of the materials. Any mechanical isolation system for the spallation region thus defines the target.

Biological shielding for the public and persons operating the spallation device is sized to comply with the regulations in force.

The accelerated particles are stopped by the spallation target so as to maximize the efficiency.

Neutronic shielding for which a device according to the invention is provided, also provides a remedy to problems of protection against charged particles.

The position of the spallation target in the system in which it is installed (for example the core of a power nuclear reactor or a transmutation reactor, the moderator of a nuclear reactor or a network of elements that can generate tritium) is preferably determined by maximizing the weighting factor $\phi^*$ that is defined in document [5].

We will now consider the advantages provided by the invention.

Figure 1:
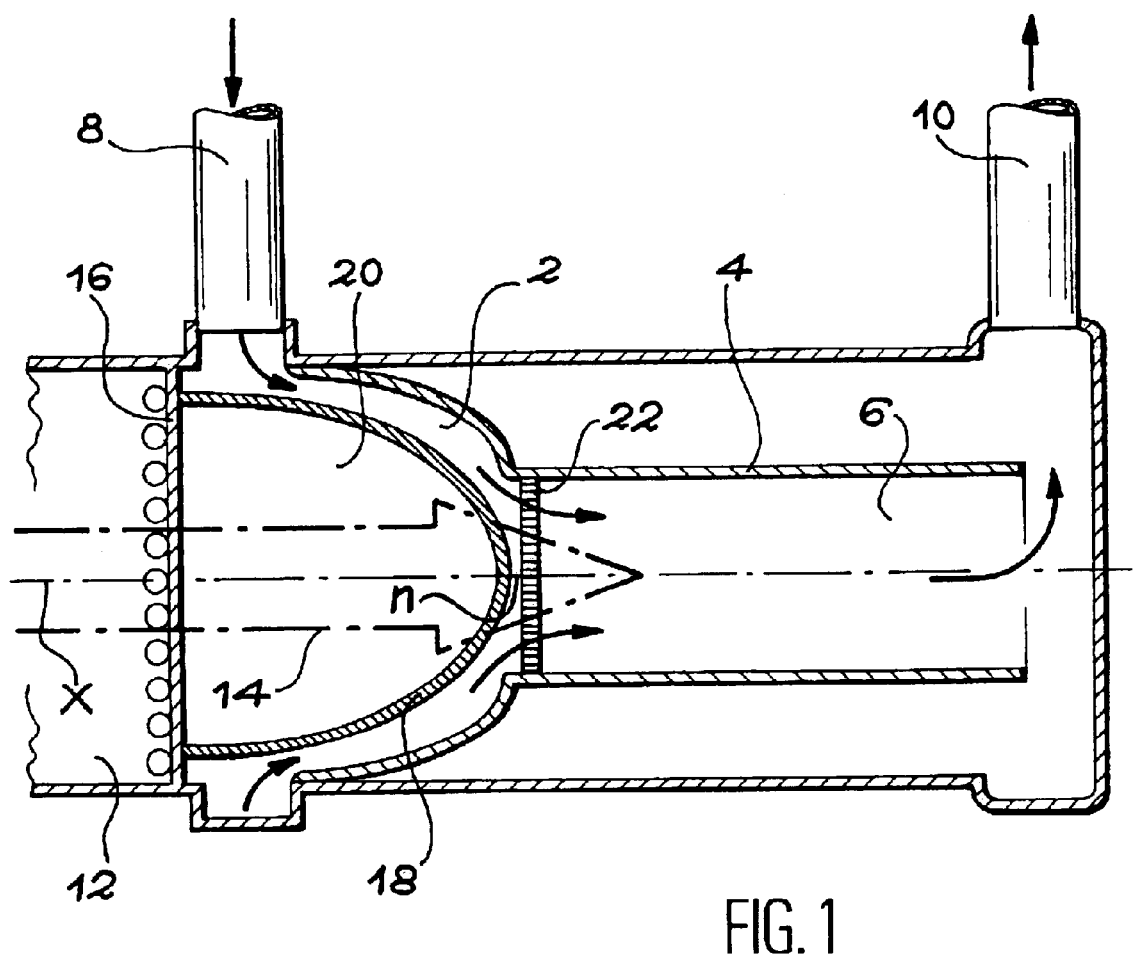
FIG. 1 is a diagrammatic longitudinal sectional view of a known spallation device that has already been described, FIG. 2 diagrammatically illustrates the radial distribution of the current density in a particle beam that is used in a known spallation device, FIG. 3 diagrammatically illustrates the radial distribution of the current density in a particle beam that can be used within this invention.
Figure 2:
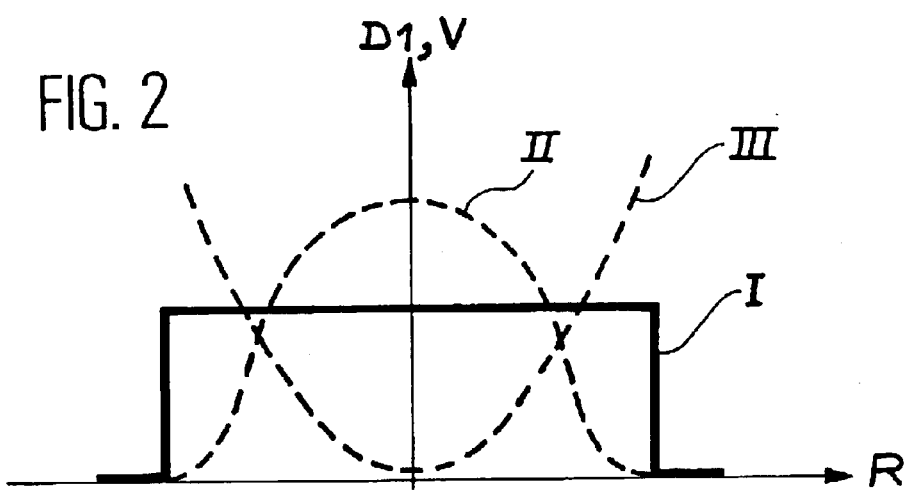

The use of a spallation target with an annular particle beam is an easy and efficient means of dissipating heat generated in the leak tight partition or window separating the spallation target from the closest vacuum zone to this spallation target (without any complicated geometry and without needing the grid 22 in FIG. 1, which is exposed to irradiation by the beam).

It is also possible to make a device conform with the invention operate with a leaky flow or a frontal flow of the heat transporting fluid, without using a flow of heat transporting fluid to cool sensitive components in the device. All that is necessary is to make the heat transporting fluid enter through a region not affected by spallation.

These advantages apply mainly to the leak tight partition which is the most highly stressed part of the system. This leak tight partition must resist a very low pressure, usually of the order of $10^{-9}$ Pa, on the side from which the particle beam arrives, and the pressure of the heat transporting fluid on the other side. The pressure of the heat transporting fluid is very high, usually more than $5 \times 10^6$ Pa when this fluid is water or a gas, and is of the order of $10^5$ Pa when the heat transporting fluid is a liquid metal.

Furthermore, the insertion of a layer of heat transporting fluid between the leak tight partition and the spallation target is a means of reducing the proportion of backscattered neutrons close to this leak tight partition. This is due to a solid angle effect and due to the fact that the heat transporting fluid diffuses the neutrons.

FIG. 9 shows a diagrammatic longitudinal sectional view of the leak tight partition or window 74 that is followed by a set 63 of conical blades 62 with central drilling, these blades being aligned along the X direction of the device (propagation axis of the particle beam).

The layer of heat transporting fluid that circulates between the leak tight partition 74 and the conical plate 62 closest to the leak tight partition, is symbolically shown by two arrows 66 closest to this partition. The arrows 76 show backscattered neutrons. The arrangement of the blade 62 can reduce the quantity of these neutrons towards the beam centre line in the direction of the partition 74. FIG. 9 also shows the incident particles beam 64.

Figure 10:
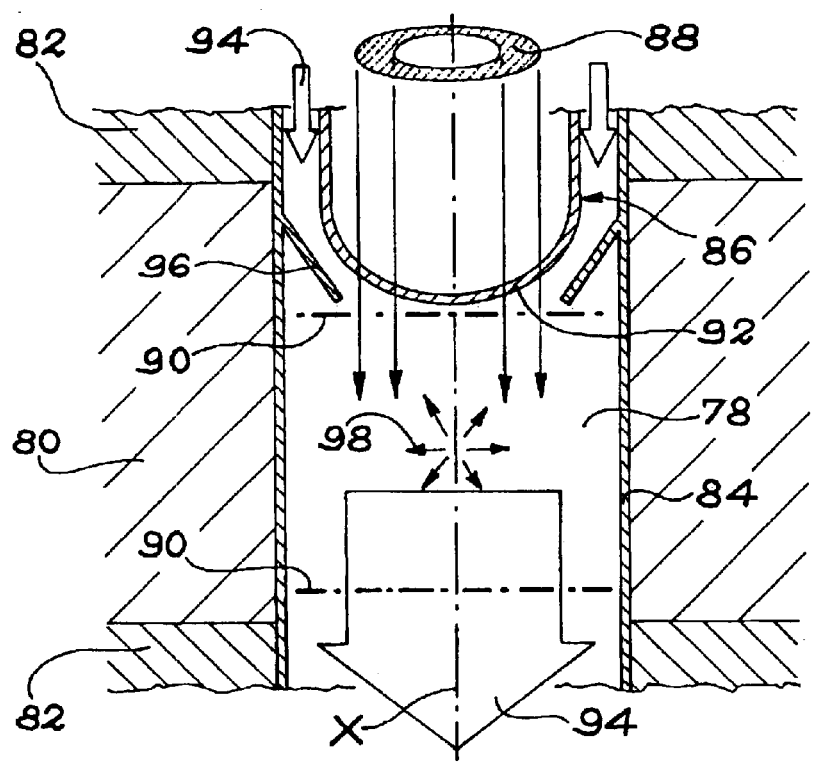

FIG. 10 is a diagrammatic longitudinal sectional view of a particular embodiment of the spallation device according to the invention.

In this example, the device forms part of the hybrid reactor for transmutation or energy production, the spallation target 78 is a liquid metal and forms the heat transporting fluid and the flow of this fluid is leaking.

The core 80 (fissile part) of the reactor in which the device was installed, can be seen. The plenum 82 can be seen on each side of the core 80.

The chamber 84 in which the spallation target 78 is circulated, and one end of the vacuum chamber 86 in which the hollow particle beam 88 is propagated in the direction of the spallation zone, can also be seen. This zone is delimited by the chain dotted lines 90, within the chamber 84.

The end of the vacuum chamber 86 is formed by the convex shaped leak tight partition 92, made for example of steel, which is convex towards the inside of the chamber 84 and that allows the beam 88 to pass through it.

The shape of the partition 92 is approximately hemispherical to prevent mechanical stress concentrations.

The means 89 of generating the hollow beam are not shown. Refer to the description of FIG. 4 for further information in this respect.

The arrows 94 symbolically show circulation of the liquid metal target. This circulation takes place along the axis of propagation of the beam and along the direction of propagation of the beam.

This X axis is the axis of symmetry of revolution of the chamber 84 and the leak tight partition 92.

The ribs 96 fixed to the internal partition of the chamber 84 close to the leak tight partition 92, can also be seen. The spacing between these ribs is sufficient to enable the particle beam 64 to pass without any interference. These ribs form a flow guide for the liquid target and therefore for the heat transporting fluid.

This fluid guide improves turbulence, and therefore heat exchanges at the leak tight partition 92.

The arrows 98 in FIG. 10 symbolize neutrons generated in the spallation zone.

The installation in which the device in FIG. 10 is installed is started progressively. The first step is to warm the heat transporting fluid up to the operating temperature in successive steps in a storage reservoir (not shown), and the heat transporting fluid is then introduced into the circuits (not shown) provided for its circulation. The pumps (not shown) are then installed, and circulate the fluid. The next step is to start the particle accelerator (not shown) at a very low intensity, and the power is increased to minimize stresses on the various structures in the installation.

The same procedure is used for stopping and for starting, in the reverse order.

Activation of the liquid heat transporting fluid and the residual power induced prevent the heat transporting fluid from freezing. Regardless of the configuration, the spallation device is sized such that the residual power, after a planned or accidental stoppage, can be dissipated by passive means such as natural convection.

The intensity of the accelerator is determined by neutron application needs, once the increase in power is complete.

In the case of a reactor generating electricity or used for transmutation, the reactivity and power (measured from data about the heat transporting fluid input and output temperatures and information from the neutronic control system) define the beam intensity.

In the case of a neutron source to be used for fundamental physics research or technological tests, the power extracted from the spallation target is controlling.

Figure 11:
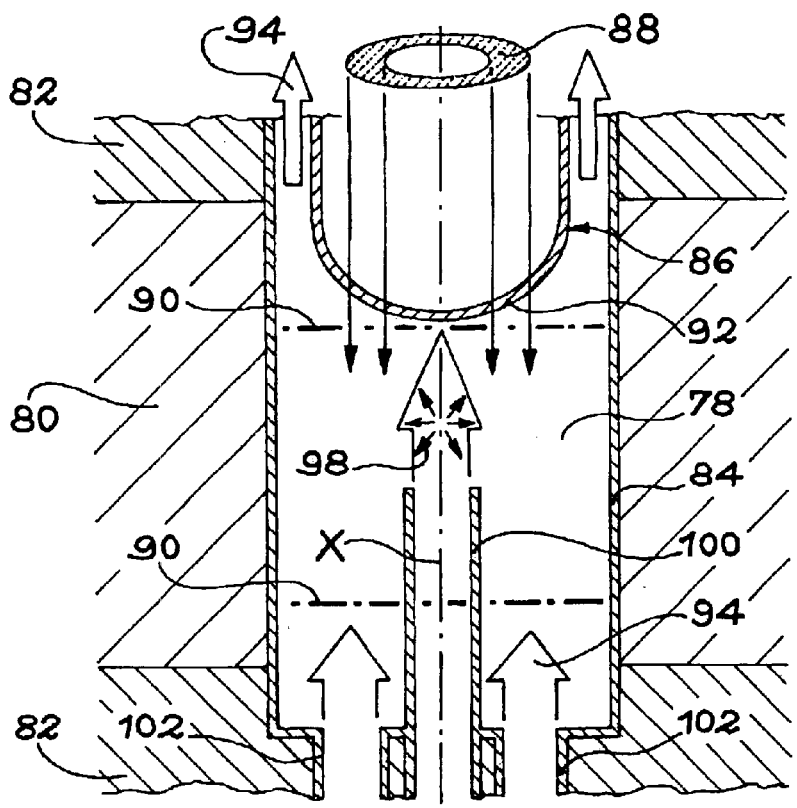

FIG. 11 shows a longitudinal diagrammatic sectional view of another particular embodiment of the device according to the invention, once again using a liquid metal spallation target, but with a frontal flow instead of a leaky flow for this liquid target and therefore for the heat transporting fluid.

Therefore, this flow takes place in the direction opposite to propagation of the particle beam 88.

The device in FIG. 11 is identical to the device in FIG. 10 except that the ribs 96 are eliminated and at the end of the chamber 84, opposite to the end with the partition 92, the device comprises a main tubular flow guide 100, the axis of which is the axis of symmetry of revolution of the device (coincident with the X axis of propagation of the particle beam 88), and openings 102 on each side of this main flow guide.

The inside diameter of the particle beam is greater than the outside diameter of this main flow guide.

The liquid spallation target (heat transporting fluid) enters the chamber 84 through the flow guide 100 and openings 102.

Figure 12:
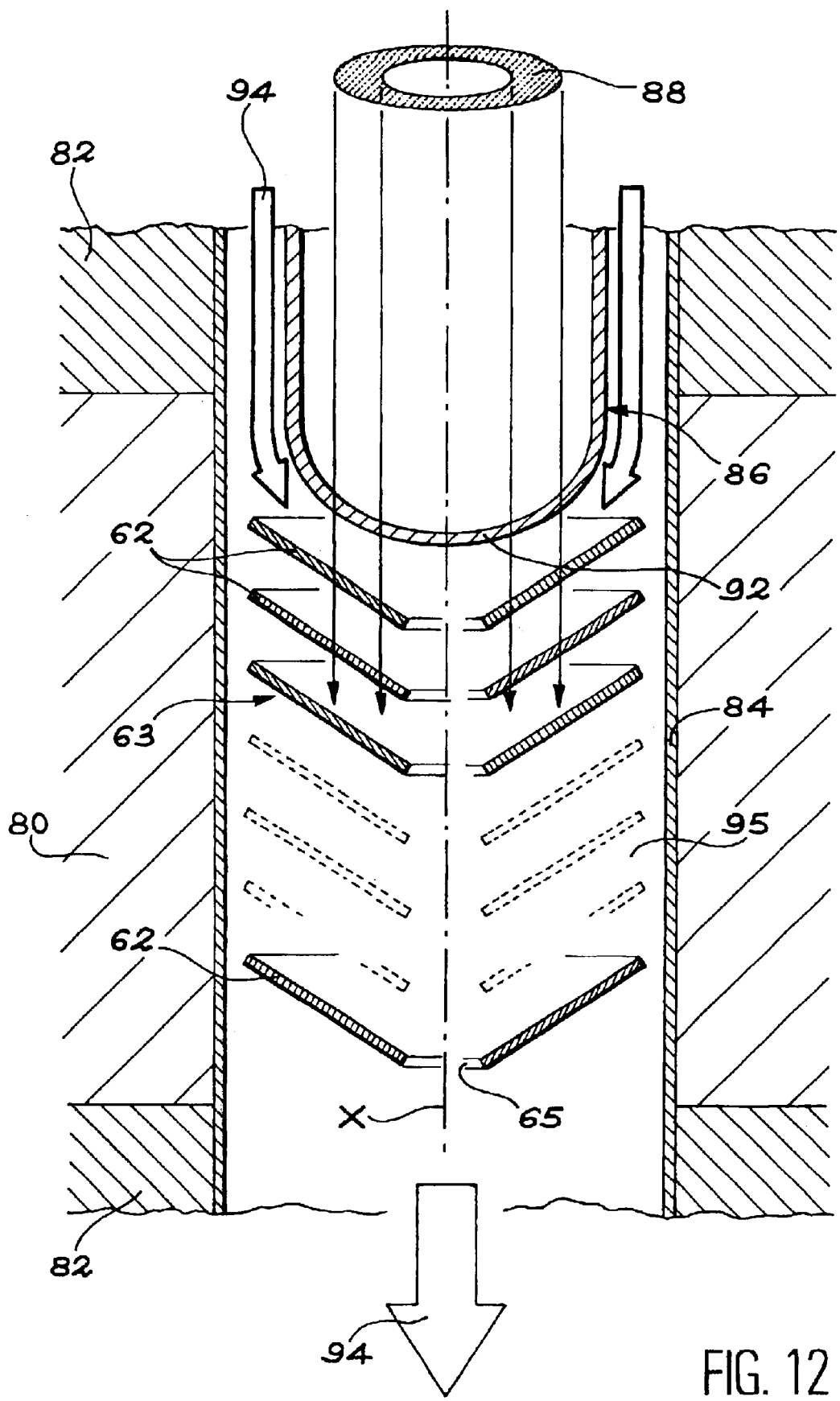

FIG. 12 shows a diagrammatic longitudinal sectional view of another particular embodiment of the device according to the invention.

This device is identical to the device in FIG. 10, except that it does not include ribs 96 and that the spallation target in it is solid.

In the example shown in FIG. 12, the heat transporting fluid flow 95 symbolized by the arrows 94 flows in the same direction as the propagation of the particle beam 88.

The spallation target 63 comprises several conical elementary targets 62 with central drilling, like the target in FIG. 7. These targets 62 are identical to each other and arranged one after the other in the chamber 84, along the X axis of propagation of the beam which is also the axis of symmetry of revolution of the spallation target and the leak tight partition 92.

The diameter common to the drillings 65 is less than the inside diameter of the beam 88, and the targets 62 have a larger common diameter that is more than the outside diameter of the beam 88.

Means, not shown, are provided to fix each elementary target 62 to the inside partition of the chamber 84.

The heat transporting fluid 95 circulates around the leak tight partition 92, between the leak tight partition and the elementary target 62 closest to this leak tight partition, and between the other elementary targets 62.

Due to their conical shape, all these elementary targets can also be used to guide the flow of heat transporting fluid.

The spallation region, delimited by lines 90 in FIGS. 10 and 11 and by the elementary end targets in the case in FIG. 12, is advantageously arranged so as to maximize the neutronic efficiency of the spallation device.

In the case of devices according to FIGS. 10 to 12, a mechanical or magnetic pump can be provided to obtain forced convection of the heat transporting fluid.

The following documents are mentioned in this description, in the order shown below:

[1] U.S. Pat. No. 5,160,696 (C. D. Bowman)

[2] U.S. Pat. No. 5,774,514 (C. Rubbia)

[3] J. M. Lagniel, The various parts of the accelerator—From the proton source to the 1 GeV beam, GEDEON Workshop "Which accelerator for which DEMO?" pp. 1–24 Aix en Provence (France), Nov. 25–26, 1999.

[4] U.S. Pat. No. 5,811,943 (A. Mishin et al.)

[5] M. Salvatores et al., Nuclear Science and engineering, 126, pp. 333–340 (1997).

What is claimed:

1. Spallation device for production of neutrons, comprising:

a spallation target configured to produce neutrons by interaction with a particle beam;

a source of a liquid spallation material for the spallation target;

a first chamber containing the spallation target and including an annular flow region having an inlet to receive the liquid spallation material;

a second chamber in which the particle beam will propagate towards the spallation target, along a propagation axis;

a hollow particle beam generator that generates a hollow particle beam that surrounds the propagation axis;

a leak tight partition through which the particle beam can pass, separating the first chamber from the second chamber and reaching the propagation axis; and the first chamber having ribs spaced around a side wall of the first chamber downstream from said inlet and adjacent a part of the leak tight partition through which the particle beam passes, said ribs terminating a distance into the first chamber.

2. Device according to claim 1, wherein the particles are chosen from the group comprising protons, deuterium nuclei, tritium nuclei, helium 3 nuclei, and helium 4 nuclei.

3. Device according to clam 1, wherein radial distribution of current density in the particle beam is approximately gaussian and is offset from an axis of symmetry of the particle beam.

4. Device according to claim 1, wherein the particle beam generator is configured to produce the hollow particle beam from a solid particle beam.

5. Device according to claim 1, wherein the spallation target is liquid and forms a heat transporting fluid.

6. Device according to claim 5, wherein the liquid spallation target moves in the first chamber along the propagation axis and in a direction of propagation of the particle beam.

7. Device according to claim 1, wherein the leak tight partition is convex towards an inside of the first chamber.

8. Device according to claim 1, wherein the leak tight partition has an axis of symmetry of revolution coincident with the propagation axis.

9. Device according to claim 1, wherein the ribs extend in one direction from said sidewall.

* * * * *